(No Model.)
C. WIEBECK.
FISHING REEL.
No. 515,184. Patented Feb. 20, 1894.
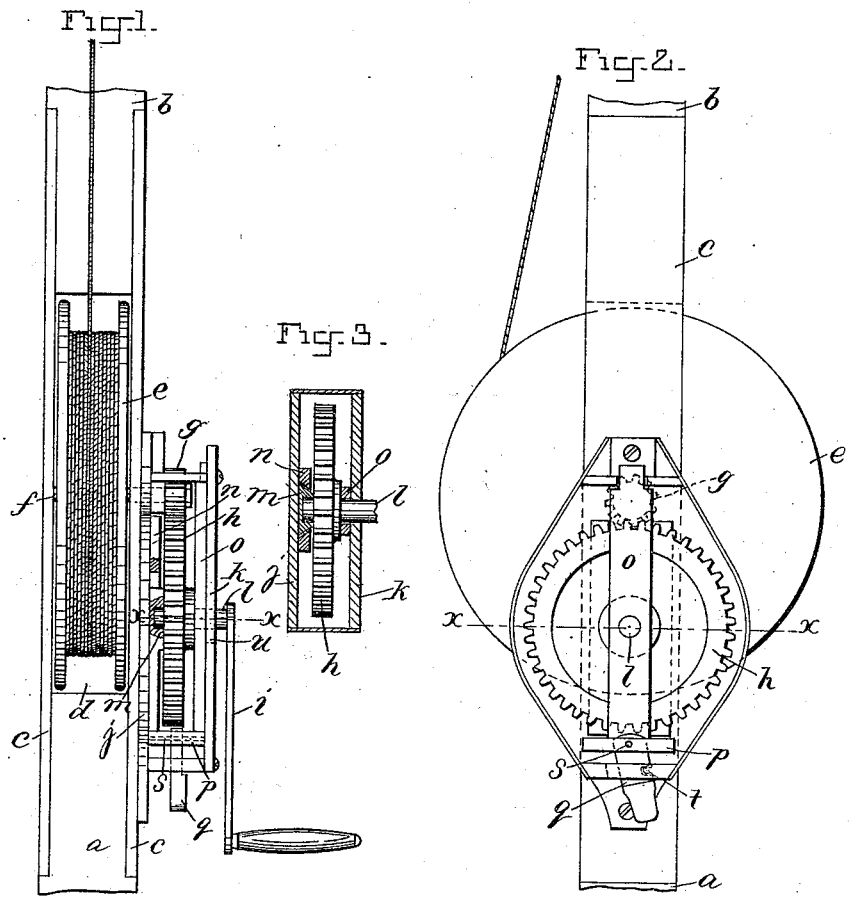
WITNESSES:
C. E. Whitney
O. J. Morgan
INVENTOR:
Carl Wiebeck
By A. P. Thayer
atty.

UNITED STATES PATENT OFFICE.

CARL WIEBECK, OF NEW YORK, N. Y.

FISHING-REEL.

SPECIFICATION forming part of Letters Patent No. 515,184, dated February 20, 1894.

Application filed March 22, 1893. Serial No. 467,174. (No model.)

*To all whom it may concern:*

Be it known that I, CARL WIEBECK, a citizen of the United States, and a resident of New York city, in the county and State of New York, have invented new and useful Improvements in Fishing Rods and Reels, of which the following is a specification.

My invention relates to the construction and arrangement of the reel, the driving gear for operating the reel, and the means for disconnecting the driver to allow the reel to run free when throwing out the hook, and for connecting it again to wind up the line, as hereinafter fully described reference being made to the accompanying drawings in which—

Figure 1, is a plan view of part of a rod, the reel, and the driving gear therefor arranged according to my invention, the cover of the inclosing case for the driving gear being removed, and part of the slide way of one of the bearings of the master wheel broken out. Fig. 2, is a side elevation of the same, with a side of the cover of the inclosing case for the driving gear removed. Fig. 3, is a transverse section of the inclosing case for the master wheel of the driving gear, and the shifting support therefor, in the axis of said master wheel, lines $x\,x$, Figs. 1 and 2.

I make the rod in two sections $a$ and $b$, connected at a suitable distance apart, by the metallic plates $c$, inclosing a space $d$, in which I mount the reel $e$, between said plates by its pivotal shaft $f$, having journal bearings in the said plates, and projecting at one end outside of one of the plates suitably to receive the toothed pinion $g$, to which motion is to be imparted by the correspondingly toothed master wheel $h$, having the crank $i$, for turning it. The shaft $f$, projects into an inclosing case for the driving gear applied to one of the plates $c$, and which may be constructed in any approved way. In this example of my invention $j$, represents the inside plate and $k$, the outside plate of said case. The shaft $l$ of the master wheel $h$, is journaled, at the inside, in the bearing $m$, fitted in a slide way $n$, which is radial to the pinion, and at the outside of said wheel said shaft is journaled in a bar $o$, also having slide way radial to the pinion, which bar and the bearing $m$, are connected to the cross head $p$, from which a catch-pawl $q$, pivoted to the cross head $p$ at $s$, extends through a slot in the end of the inclosing case next to the person holding the rod, suitably to be manipulated by the hand of the person for shifting the master wheel into or out of gear with the pinion, said catch-pawl having a notch $t$, engaging a spur of the end of the case through which it projects for holding the master wheel in gear as seen in Fig. 2. In this example of my invention the slide way $n$, is a dove tail groove in the side of the side plate of the case next to the rod, and lengthwise of said side, and the bearing $m$, is of corresponding dove tail shape suited to be confined in said groove, and it is extended lengthwise in the direction opposite to the pinion far enough to reach and be connected to the cross head and it supports the cross head; bar $o$ has one end attached to and supported by the cross head, and the other end has its bearing in a slot in the end of the case. The slide ways may however be constructed in any approved way, the essential feature of my invention being the arrangement of means for shifting the master wheel toward and from the pinion in a direction radial to the pinion.

The hole through the outside plate $k$, of the case for the shaft $l$, of the master wheel is suitably elongated as indicated by the dotted line $u$, for allowing the master wheel to be so shifted.

I claim—

1. The combination with the reel mounted in the reel space in the rod, and having the pinion on the end of its shaft projecting through one of the side plates of the rod, of the master wheel, having its shaft mounted in the bearing, and in the bar $o$ having slide ways in a direction radial to the axis of the pinion, said shaft extending through the side of the case and provided with the crank, the hole in the side of the case for the shaft being elongated for the movement of the shaft substantially as described.

2. The combination with the reel mounted in the reel space in the rod, and having the pinion on the end of its shaft projecting through one of the side plates of the rod, of the master wheel having its shaft mounted in the bearing and in the bar $o$ having slide ways in a direction radial to the axis of the pinion, the cross-head connected to said bearing and bar, and the catch pawl pivoted to said cross head and projecting through the end of the case having a catch spur, the said shaft of the master wheel extending through a slot of the side of the case and having the crank attached to it substantially as described.

In testimony that I claim the foregoing as my invention I have signed my name, in presence of two witnesses, this 2d day of March, 1893.

CARL WIEBECK.

Witnesses:
W. J. MORGAN,
C. E. WHITNEY.